US007788442B2

(12) United States Patent
Kolvick et al.

(10) Patent No.: US 7,788,442 B2
(45) Date of Patent: Aug. 31, 2010

(54) COMPUTER MEMORY ACCESSIBLE IN EITHER POWER STATE OF THE COMPUTER

(75) Inventors: Randolph S. Kolvick, Durham, NC (US); Barry A. Kritt, Raleigh, NC (US); Thomas S. Mazzeo, Durham, NC (US); Rodney E. Shepard, II, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 473 days.

(21) Appl. No.: 11/934,760

(22) Filed: Nov. 3, 2007

(65) Prior Publication Data

US 2009/0119445 A1    May 7, 2009

(51) Int. Cl.
*G06F 12/00* (2006.01)
(52) U.S. Cl. .................. 711/103; 711/154; 710/313; 713/1
(58) Field of Classification Search .................. None
See application file for complete search history.

(56) References Cited

U.S. PATENT DOCUMENTS 5,278,759 A * 1/1994 Berra et al. .................. 701/1

| 7,073,013 | B2 | 7/2006 | Lassar |
| 2005/0120146 | A1 | 6/2005 | Chen et al. |
| 2005/0216624 | A1 | 9/2005 | Deng et al. |
| 2005/0223145 | A1 | 10/2005 | Lin et al. |
| 2006/0059293 | A1 | 3/2006 | Wurzburg et al. |

* cited by examiner

*Primary Examiner*—Kevin Verbrugge
(74) *Attorney, Agent, or Firm*—Cynthia G. Seal, Esq.; Steven M. Greenberg, Esq.; Carey, Rodriguez, Greenberg & Paul, LLP

(57) ABSTRACT

A system on a computer for providing access to data stored on the computer in either power state is provided. The system can include a memory module and an external data interface connector. The system can further include a data interface controller for managing a data interface to the memory module and a data interface to the external data interface connector. The system can further include a multiplexer conductively connecting the data interface controller with the memory module when the computer is powered on, the multiplexer conductively disconnecting the data interface controller from the memory module when the computer is powered off and the multiplexer conductively connecting the external data interface connector with the memory module when the computer is powered on.

13 Claims, 2 Drawing Sheets

COMPUTER MEMORY ACCESSIBLE IN EITHER POWER STATE OF THE COMPUTER

BACKGROUND OF THE INVENTION

1. Field of the Invention

The present invention relates to computer storage, and more particularly relates to computer storage that is accessible during varying power states.

2. Description of the Related Art

In the field of computer manufacturing, it is desirable to instill a manufactured computer with just-in-time firmware updates, such as an appropriate BIOS. Firmware versions frequently change, especially on new products. These changes may contain important quality, reliability, or performance updates. Installing a firmware version as late as possible in the computer manufacturing process can result in better product quality and lower manufacturing cost by eliminating a rework of a finished product. Thus, it is desirable for firmware updates to be as current as possible prior to shipping a manufactured computer to a customer.

Another example of late-stage installation of software and firmware involves just-in-time customization and personalization. There is a high inventory carrying cost associated with having large numbers of models of a given computer type. Therefore producing generic models that can be converted to more specialized models as late in the computer manufacturing process as possible is advantageous. Converting generic models to specialized models can involve hardware changes and software changes, such as language choices and application selections. Personalization of a computer can include order-specific or customer-specific items such as asset tag numbers (both externally affixed and saved internally in nonvolatile memory), custom network settings (such as computer name and TCPIP settings), BIOS settings (such as boot sequence and memory mirroring selections), and BIOS modifications (such as the startup screen logo and other default settings).

Another advantage of late-stage modification of software and firmware involves order cancellation and returns. In cases where customers cancel orders late in the computer manufacturing process or return purchased items to the manufacturer, it is necessary to rework these products, which may have been customized or personalized with software and additionally may have firmware, which requires updating.

Conventionally, the installing or modifying of software, firmware and settings on a computer during the manufacturing process involves removing the computer from its shipping carton, setting up the computer (connecting the power source, the keyboard, the monitor, etc.), powering up the machine and booting up the operating system. Then an administrator manually installs the desired software, firmware or settings. This multi-step process can be time consuming and tedious and can lead to delays in shipping.

One approach to this problem involves the use of RFID devices in computers. The RFID devices are used so as to wirelessly write small amounts of data to the device late in the manufacturing process or during the post-manufacturing process using RFID writers. The information stored can then be read (using internal wired connections) by the computer when it is powered on. This method could be used to store small amounts of information, however it could not be used to store the large amounts of data (megabyte to gigabyte range) needed to accomplish the goals of the computer manufacturer.

Therefore, a need arises for a more efficient method for installing and modifying firmware, software and settings in a computer during the manufacturing process.

BRIEF SUMMARY OF THE INVENTION

Embodiments of the present invention address deficiencies of the art in respect to computer memory and provide a novel and non-obvious method and system for providing access to data stored on a computer when the computer is both powered on and powered off. In one embodiment of the invention, a method for providing access to data stored on the computer in either power state is provided. The method can include providing power to a data interface controller and a memory module when the computer is powered on, wherein the data interface controller manages a data interface to the memory module. The method can further include conductively connecting, by a multiplexer, the data interface controller and the memory module when the computer is powered on. The method can further include conductively connecting, by the multiplexer, the data interface controller and an external data interface connector when the computer is powered on. The method can further include terminating power to the data interface controller and the memory module when the computer is powered off. The method can further include conductively disconnecting, by the multiplexer, the data interface controller from the memory module and the external data interface connector when the computer is powered off. The method can further include conductively connecting, by the multiplexer, the memory module and an external data interface connector when the computer is powered off.

In another embodiment of the invention, a system on a computer for providing access to data stored on the computer in either power state is provided. The system can include a memory module and an external data interface connector. The system can further include a data interface controller for managing a data interface to the memory module and a data interface to the external data interface connector. The system can further include a multiplexer conductively connecting the data interface controller with the memory module when the computer is powered on, the multiplexer conductively disconnecting the data interface controller from the memory module when the computer is powered off and the multiplexer conductively connecting the external data interface connector with the memory module when the computer is powered off.

In yet another embodiment of the invention, a system on a computer for providing access to data stored on the computer in either power state is provided. The system can include a memory module and an external data interface connector. The system can further include a data interface controller for managing a data interface to the memory module and a data interface to the external data interface connector. The system can further include a power module for providing power to the data interface controller and the memory module when the computer is powered on and a conductor for conducting power from an external power source, the conductor conductively connecting the external data interface connector and the memory module. The system can further include a multiplexer conductively connecting the data interface controller with the memory module when the computer is powered on, the multiplexer conductively disconnecting the data interface controller from the memory module when the computer is powered off and the multiplexer conductively connecting the external data interface connector with the memory module when the computer is powered off.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method and system for providing access to data stored on a computer when the computer is both powered on and powered off. The present invention allows a computer manufacturer to create generic computer models and subsequently install or modify firmware, software, customization information, settings or personalization information late, or after, the manufacturing process. The present invention allows a manufacturer to install or modify firmware, software, customization information, settings or personalization information without bringing a computer back thru the manufacturing process, without having to power up the computer, without having the computer perform operations, and without removing the machine from a shipping carton. In many cases, the installation of the firmware, software, customization settings or personalized information are updated by application programs that require the computer to be powered on and running an operating system. In these cases, the present invention is used to copy files to an internal memory module. The files in the internal memory module can be accessed by the application programs when the computer is next powered on and the operating system is running.

Figure 1:
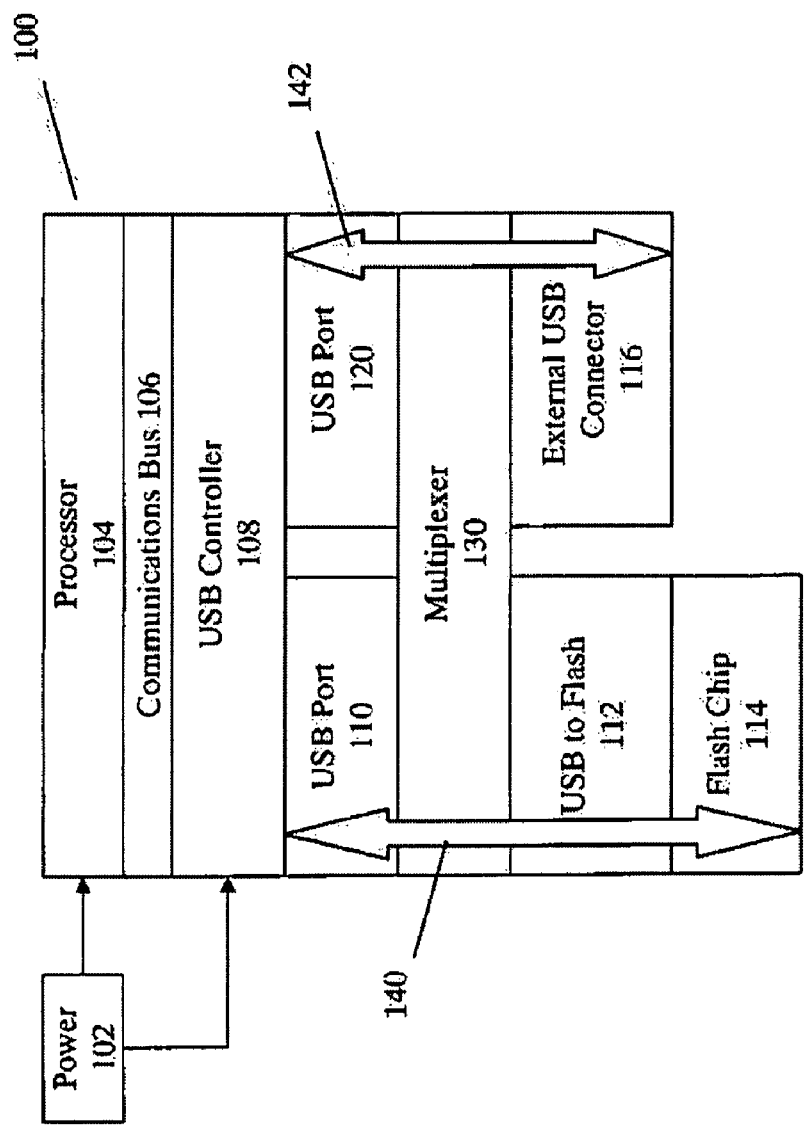
FIG. 1 is a block diagram illustrating a device for providing access to stored data on a computer when the computer is powered on, according to one embodiment of the present invention; and, FIG. 2 is a block diagram illustrating a device for providing access to stored data on a computer when the computer is powered off, according to one embodiment of the present invention.

FIG. 1 is a block diagram illustrating a device for providing access to stored data on a computer 100 when the computer 100 is powered on, according to one embodiment of the present invention. FIG. 1 shows a processor 104 comprising a microprocessor, which is a programmable digital electronic component that incorporates the functions of a central processing unit (CPU) on a single semi-conducting integrated circuit (IC). One or more microprocessors typically serve as the CPU in a computer system, embedded system, or handheld device.

FIG. 1 further includes a communications bus 106 connecting the processor 104 and the Universal Serial Bus (USB) controller 108. The bus 106 is a subsystem that transfers data between computer components inside a computer and can logically connect several peripherals over the same set of wires. The USB controller 108 controls and manages one or more USB serial data connections. USB is a serial bus standard to interface devices. USB allows peripherals to be connected using a single standardized interface socket, allowing devices to be connected and disconnected without rebooting the computer (hot swapping). USB also powers low-consumption devices without the need for an external power supply and allows some devices to be used without requiring individual device drivers to be installed. Serial communications involve the process of sending data one bit at one time, sequentially, over a communications channel or communications bus.

Connected to the USB controller 108 are two USB ports 110 and 120. Each of the ports 110, 120 comprise a terminal or a data interface to the USB controller 108. Both ports 110, 120 are connected to the multiplexer 130, which is a device that performs multiplexing. The multiplexer 130 is conductively connected to a plurality of data and power input sources and conductively routes each source to one of two output channels according to the power state of the computer 100. The multiplexer 130 can be implemented with a plurality of single pole, double throw relays or equivalent circuitry.

Connected to the multiplexer 130 is a USB to flash module 112 and a flash chip 114. The flash chip 114 is a memory module, which is non-volatile computer memory that can be electrically erased and reprogrammed. Flash memory is primarily used in memory cards, and USB flash drives (thumb drives, memory sticks, flash sticks, and jump drives) for general storage and transfer of data between computers and other digital products. Flash memory is a specific type of EEPROM that is erased and programmed in large blocks. The USB to flash module 112 is an interface that allows USB controller 108 to use the USB serial data interface standard to access the flash chip 114.

Also connected to the multiplexer 130 is an external USB connector 116 that provides a plug in which to attach another USB format device. There are various types of USB connectors, such as Micro USB, Micro-A USB, Micro-B USB, Micro AB-USB, Mini USB, Mini-B USB, A-Type, female A-Type and B-Type.

The power source 102 is the power source of the computer 100 and therefore provides power to the processor 104 and the USB controller 108. When the computer 100 is powered on, power is provided to the USB to flash module 112 and the flash chip 114 via multiplexer 130. The multiplexer 130 is wired so as to logically and conductively connect USB port 110 to USB to flash module 112 when the computer 100 is powered on. Thus, when the computer 100 is powered on, the processor 104 may access the data stored on the flash chip 114. In this case, the computer 100 may execute programs or run computer code that is stored on the flash chip 114. Further, when the computer 100 is powered on, power is provided from USB controller 108 via USB port 110 to USB to flash module 112 and flash chip 114. See the conductive path 140 of FIG. 1. In one embodiment of the present invention, the power source 102 provides about 5V and about 100 mA of current to the flash chip 114.

The multiplexer 130 is further wired so as to logically and conductively connect USB port 120 to external USB connector 116 when the computer 100 is powered on. Thus, when the computer 100 is powered on, the external USB connector 116 is functional so as to allow a USB interface device to be plugged into connector 116. In this case, any USB interface device plugged into connector 116 interfaces with the computer 100 conventionally. See the conductive path 142 of FIG. 1.

The multiplexer 130 is further wired so as to conductively disconnect the USB port 110 from USB to flash module 112 when the computer 100 is powered off. This is explained in greater detail with reference to FIG. 2 below.

It should be noted that although certain components of FIG. 1 adhere to the USB serial bus interface standard, such as USB controller 108, USB ports 110, 120, USB to flash module 112 and external USB connector 116, the present invention supports various serial bus interface standards. Another serial bus interface standard supported by the present invention includes IEEE 1394 (FireWire). It should further be noted that although memory module 114 comprises flash memory, the present invention supports various types of non-volatile memory.

Figure 2:
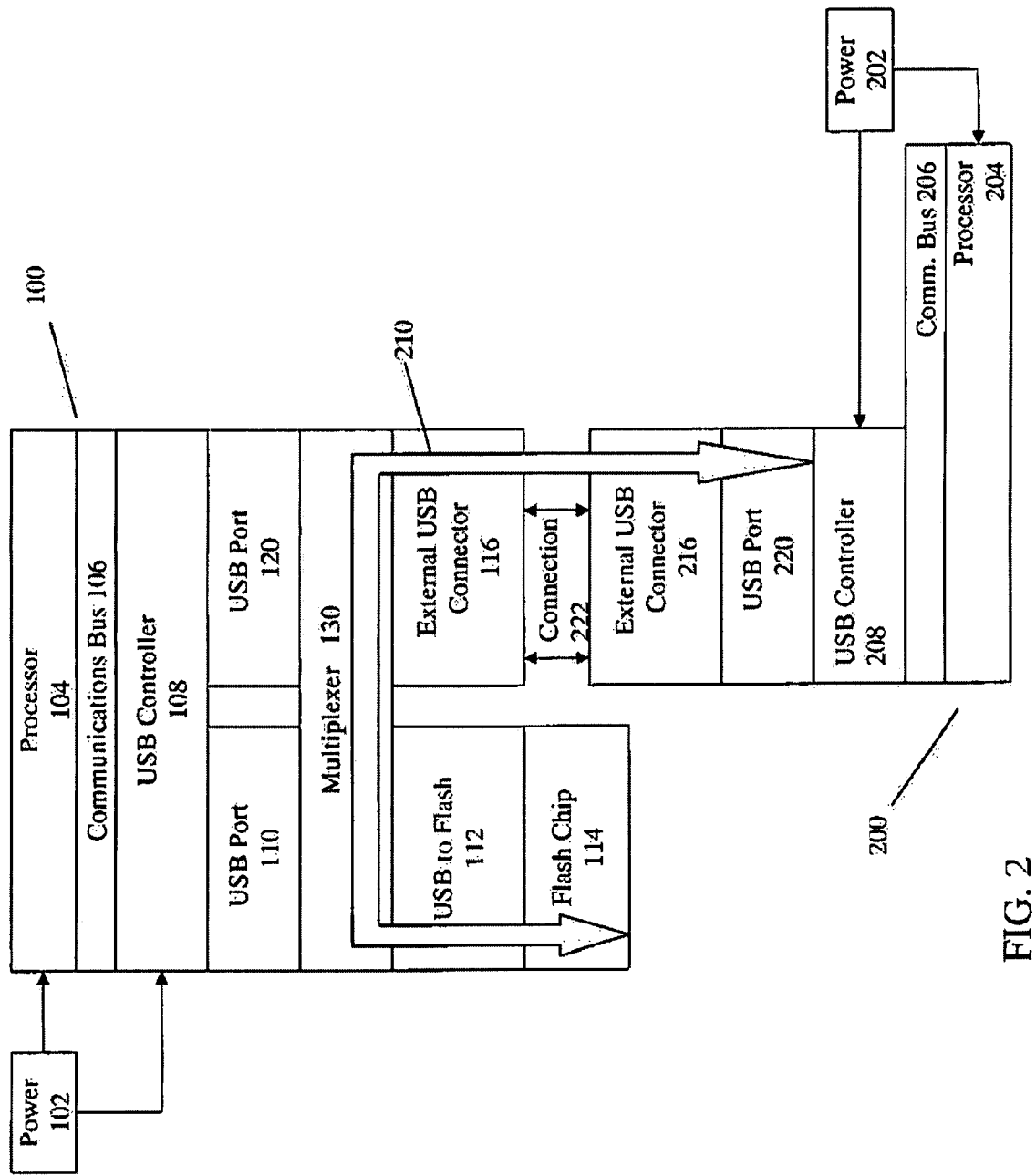

FIG. 2 is a block diagram illustrating a device for providing access to stored data on a computer when the computer is powered off, according to one embodiment of the present invention. FIG. 2 shows another computer 200, which may be a desktop computer, a laptop computer, a PDA, a smartphone, a game console or any computing mechanism that performs operation via a microprocessor. Like computer 100, the computer 200 comprises a processor 204, a communications bus 206, a USB controller 208, a USB port 220 and an external USB connector 216. The external USB connector 216 may connect to the external USB connector 116 of computer 100 via a connection 222.

As explained above, the multiplexer 130 is wired so as to logically and conductively disconnect USB port 110 from USB to flash module 112 when the computer 100 is powered off. Also, when the computer 100 is powered off, the multiplexer 130 is wired so as to logically and conductively connect the external USB connector 116 to USB to flash module 112. Thus, when the computer 100 is powered off, the USB port 110 is disconnected from USB to flash 112 and the external USB connector 116 is connected to the USB to flash 112.

The power source 202 is the power source of the computer 200 and therefore provides power to the processor 204 and the USB controller 208 when the computer 200 is powered on. The multiplexer 130 is wired so as to logically and conductively connect external USB connector 116 with USB to flash module 112 when the computer 100 is powered off. When connector 216 is connected to connector 116, computer 100 is powered off and computer 200 is powered on, then there is further a logical connection between computer 200 and flash chip 114. Thus, when the computer 200 is powered on, computer 100 is powered off and connector 216 is connected to connector 116, the processor 204 may access (including write, overwrite, delete or modify) the data stored on the flash chip 114.

Further, when the computer 200 is powered on, computer 100 is powered off and connector 216 is connected to connector 116, power is provided from USB controller 208 to flash chip 114. See the conductive path 210 of FIG. 2. In one embodiment of the present invention, the power source 202 provides about 5V and about 100 mA of current to the flash chip 114.

Embodiments of the invention can take the form of an entirely hardware embodiment or an embodiment containing both hardware and software elements. In a preferred embodiment, the invention is implemented in hardware. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A system on a computer for providing access to data stored on the computer in either power state, comprising:
a memory module;
an external data interface connector;
a data interface controller for managing a data interface to the memory module and a data interface to the external data interface connector; and
a multiplexer conductively connecting the data interface controller with the memory module when the computer is powered on, the multiplexer conductively disconnecting the data interface controller from the memory module when the computer is powered off and the multiplexer conductively connecting the external data interface connector with the memory module when the computer is powered off.

2. The system of claim 1, wherein the memory module is a flash drive.

3. The system of claim 2, wherein the external data interface connector is an external serial data interface connector.

4. The system of claim 3, wherein the external data interface connector is any one of a USB connector and an IEEE 1394 connector.

5. The system of claim 3, wherein the data interface controller is a serial data interface controller.

6. The system of claim 5, wherein the data interface controller is any one of a USB controller and an IEEE 1394 controller.

7. The system of claim 1, further comprising a power module for providing power to the data interface controller and the memory module when the computer is powered on.

8. A system on a computer for providing access to data stored on the computer in either power state, comprising:
a memory module;
an external data interface connector;
a data interface controller for managing a data interface to the memory module and a data interface to the external data interface connector;
a power module for providing power to the data interface controller and the memory module when the computer is powered on;

a conductor for conducting power from an external power source, the conductor conductively connecting the external data interface connector and the memory module; and a multiplexer conductively connecting the data interface controller with the memory module when the computer is powered on, the multiplexer conductively disconnecting the data interface controller from the memory module when the computer is powered off and the multiplexer conductively connecting the external data interface connector with the memory module when the computer is powered on.

9. The system of claim 8, wherein the memory module is a flash drive.

10. The system of claim 9, wherein the external data interface connector is an external serial data interface connector.

11. The system of claim 10, wherein the data interface controller is a serial data interface controller.

12. A method on a computer for providing access to data stored on the computer in either power state, comprising:

providing power to a data interface controller and a memory module when the computer is powered on, wherein the data interface controller manages a data interface to the memory module;

conductively connecting, by a multiplexer, the data interface controller and the memory module when the computer is powered on;

conductively connecting, by the multiplexer, the data interface controller and an external data interface connector when the computer is powered on;

terminating power to the data interface controller and the memory module when the computer is powered off;

conductively disconnecting, by the multiplexer, the data interface controller from the memory module and the external data interface connector when the computer is powered off; and conductively connecting, by the multiplexer, the memory module and an external data interface connector when the computer is powered off.

13. The method of claim 12, further comprising:

providing power to the memory module from an external power source via the external data interface connector.

* * * * *